United States Patent Office
3,274,230
Patented Sept. 20, 1966

3,274,230
PENTASUBSTITUTED GUANIDINES CONTAINING CYANO GROUPS
Robert A. Braun, Newark, Del., assignor to E. I. du Pont de Nemours and Company, Wilmington, Del., a corporation of Delaware
No Drawing. Filed Sept. 18, 1962, Ser. No. 224,541
6 Claims. (Cl. 260—465.5)

This invention relates to a new class of pentasubstituted guanidine compounds. It in particular relates to the pentasubstituted guanidines resulting from the addition reaction of $N^1,N^1,N^3,N^3$-tetrasubstituted guanidines with ethylenically and acetylenically unsaturated compounds. It further relates to the process for producing such compounds.

The compounds of this invention are represented by the following structural formula:

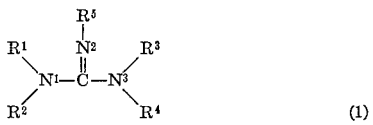

in which:

$R^1$, $R^2$, $R^3$ and $R^4$ can be the same or different and can be:

(a) $C_1$–$C_5$ alkyl, $C_3$–$C_5$ alkenyl or $C_1$–$C_4$-alkoxy-$C_1$–$C_4$ alkyl radicals;
(b) When $R^1$ is combined with $R^2$ and/or $R^3$ is combined with $R^4$ to form heterocyclic groups containing $N^1$ and $N^3$ respectively, they are $C_4$–$C_6$ polymethylene or oxydiethylene radicals;
(c) When $R^1$ is combined with $R^3$, it is a $C_2$–$C_3$ alkylene radical and $R^2$ and $R^4$ are $C_1$–$C_5$ alkyl radicals; and $R^5$ is an ethyl or vinyl group substituted with:

(a) One phenyl, cyano, carbamyl, $C_1$–$C_5$ carbalkoxy or trifluoromethyl radical; or
(b) Two cyano, $C_1$–$C_5$ carbalkoxy, carbamyl or trifluoromethyl radicals; or
(c) One $C_1$–$C_5$ carbalkoxy radical paired with: one carboxymethyl ($HOOCCH_2$—) or one $C_1$–$C_5$ carbalkoxymethyl radical.

These compounds are prepared by the addition reaction of $N^1,N^1,N^3,N^3$-tetrasubstituted guanidines with certain classes of substituted vinyl and acetylenic or ethynyl compounds. Thus, styrene, acrylonitrile, and the esters and amides of such acids as acrylic, itaconic, propriolic, fumaric, maleic and acetylene dicarboxylic, and trifluoromethyl ethylenes or acetylenes are useful. The preferred substituents are characterized by their asserting a strong electron-withdrawing effect on the unsaturated molecule or, when used with other donor substituents, at least a net electron-withdrawing effect. The reaction can be carried out in bulk or in the presence of inert, preferably nonpolar solvents, in a temperature range of 0° to 150° C. and preferably in the substantial absence of oxygen, peroxides or water.

The compounds of this invention are primarily useful as dry accelerators in combination with siccative metals in various air drying coating vehicles such as vinyl cyclic acetals, alkyd resins, and drying oils. They are particularly useful as dry accelerators in vinyl dioxolane vehicles. These compounds also are acid acceptors and are particularly useful in removing or inactivating mineral acid by-products from organic reactions. These compounds further show biological activity and are useful, for example, as aphicides and miticides.

The substituents on the $N^1$ and $N^3$ nitrogen atoms of the above structural Formula 1 (and on the corresponding tetrasubstituted guanidines used as raw materials) designated $R^1$, $R^2$, $R^3$ and $R^4$ are as follows:

The $C_1$–$C_5$ alkyl radicals include methyl, ethyl, propyl, butyl and pentyl. The $C_3$–$C_5$ alkenyl radicals include allyl, methallyl, butenyl and pentenyl. The $C_1$–$C_4$-alkoxy-$C_1$–$C_4$ alkyl radicals include the methoxy, ethoxy, propoxy and butoxy substituted methyl, ethyl, propyl and butyl radicals. Heterocyclic substituted equivalents of the guanidines are also included as explained below:

(a) Where $R^1$ is combined with $R^3$, the substituent is such a $C_2$–$C_3$ alkylene radical as ethylene or trimethylene yielding hence the corresponding imidazolidine and hexahydropyrimidine structures when combined with the $N^1$—C—$N^3$ group.
(b) Where $R^1$ is combined with $R^2$ and/or when $R^3$ is combined with $R^4$, the substituents are such divalent radicals as tetramethylene, pentamethylene, hexamethylene and oxydiethylene, and thereby in combination with the $N^1$ and $N^3$ nitrogen atoms, described N-heterocyclic radicals such as:

Pyrrolidino
Piperidino
Morpholino
Azepano
Azepeno

It is by virtue of these $N^1$ and $N^3$ heterocyclic substituents that an alternative nomenclature for this sub-class of N-substituted guanidines is preferred respectively herein, that is:

2-imino-$N^1,N^3$-dialkylimidazolidine

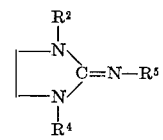

2-imino-$N^1,N^3$-dialkylhexahydropyrimidine

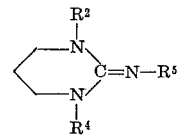

1-(dihydrocarbylamino)-1-(N-heterocycloalkyl)methyleneimine

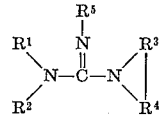

1,1-di(N-heterocycloalkyl)methyleneimines

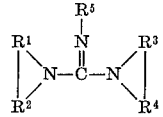

The basic amine and imine structures (having no $N^2$ substitution, i.e. $R^5$=H) of the compounds are prepared readily by procedures known in the art, for example, in Canadian Patent 629,251; German Patent 1,795,738; U.S. Patents 1,784,442 and 2,983,674.

The substituents of the $R^5$ ethyl or vinyl groups include, among the others hereinbefore named, the $C_1$–$C_5$ carbalkoxy radicals: carbomethoxy, carboethoxy, carbopropoxy, carbobutoxy and carbopentoxy and the $C_1$–$C_5$ carbalkoxymethyl radicals (i.e.,

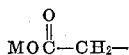

where M is the $C_1$–$C_5$ alkyl radical): carbomethoxymethyl, carbethoxymethyl, carbopropoxymethyl, carbobutoxymethyl and carbopentoxymethyl. $R^5$ as a carbamyl group includes both the

radical as well as the N-alkyl and N,N-dialkyl substituted carbamyl radicals

and

respectively, where M is a $C_1$ to $C_5$ alkyl radical.

Example I

A stirred reaction vessel equipped for heating and refluxing was charged with 29.2 parts (0.55 mol) of acrylonitrile and 57.5 parts (0.50 mol) of $N^1,N^1,N^3,N^3$-tetramethylguanidine (hereinafter abbreviated to TMG), flushed with nitrogen and heated between 80°–90° C. for about 10 hours. The mixture was then fractionated at 109°–110° C. at 1.5 mm. Hg to yield $N^2$-β-cyanoethyl-$N^1,N^1,N^3,N^3$-tetramethylguanidine identified by NMR spectra and by the following elemental analysis.

Theory: 57.11% C, 9.59% H, 33.30% N. Found: 57.14% C, 9.94% H, 33.07% N.

Analogous products are prepared by substitution of other tetrasubstituted guanidines on a molar basis for the TMG in the above example, yielding such compounds as $N^2$-β-cyanoethyl-$N^1,N^1,N^3,N^3$-tetraethylguanidine or $N^2$-β-cyanoethyl-$N^1,N^1,N^3,N^3$-tetrabutylguanidine.

The above compounds are acid acceptors useful for neutralizing strong acids, such as HCl, in certain types of organic reactions. For example, in reacting organic acid chlorides with diamines in solvents to provide fiber-forming polymers, these guanidines form soluble hydrochlorides that permit high polymer molecular weights and avoid the filtration and fiber discontinuity problems associated with the insoluble chlorides that would be formed by neutralizing with lime, ammonia, etc.

A solution of 3 parts sebacoyl chloride dissolved in 100 parts of hexamethylphosphoramide is added with rapid stirring to a solution of 4.4 parts hexamethylenediamine and 13 parts 2-(β-cyanoethyl)-$N^1,N^1,N^3,N^3$-tetramethylguanidine in 50 parts hexamethylphosphoramide. The substantially clear solution is then extruded through a spinnerette into a warm water bath and the spun fiber formed and thereby washed of the residual solvent and the dissolved guanidine hydrochloride, without destroying the fiber integrity. A strong polyamide fiber results on further washing, drying and orienting by drawing. In contrast, a similar reaction carried out with ammonia as a neutralizing agent replacing the guanidine produces a solution cloudy with ammonium chloride crystals which produces a weak, pool quality fiber when compared to the first fiber above.

Example II

Using the equipment of Example I, 57.5 parts (0.5 mol) of TMG, 50.0 parts (0.5 mol) of freshly distilled ethyl acrylate and 130 parts of benzene were heated for 6 hours at about 85° C. The mixture was then fractionated at 97° C. at 0.7 mm. Hg to yield the $N^2$-(ethyl acrylate) adduct of $N^1,N^1,N^3,N^3$-tetramethylguanidine. This product, alternatively named $N^2$-(β-carbethoxyethyl)-$N^1,N^1,N^3,N^3$-tetramethylguanidine, is identified by infrared spectra and the following elemental analysis.

Theory: 55.81% C, 9.83% H, 19.52% N. Found: 56.09% C, 9.90% H, 20.90% N.

Example III

Using the equipment of Example I, equimolar amounts of TMG and dimethyl acetylenedicarboxylate were reacted in about double the weight of diethyl ether by gently refluxing at about 35° C. for 24 hours. The ether was then stripped off under vacuum and the residue fractionated at 140°–146° C. at 1.0 mm. Hg. The product was identified as the $N^2$-(dimethyl acetylenedicarboxylate) adduct of $N^1,N^1,N^3,N^3$-tetramethylguanidine by infrared spectra and the following elemental analysis.

Theory: 51.35% C, 7.44% H. Found: 51.55% C, 7.70% H.

Example IV

Using the procedure and equipment of Example I, equimolar amounts of TMG and allyl acrylate were reacted in about 3.5 times the weight of toluene at 115° C. for about 24 hours. At the end of this time the toluene was stripped off and the residue fractionated at 100°–102° C. at 0.03 mm. Hg to yield a product analyzing as follows and identified by infrared spectra as the $N^2$-(allyl acrylate) adduct of $N^1,N^1,N^3,N^3$-tetramethylguanidine, i.e., $N^2$-carballyloxyethyl-$N^1,N^1,N^3,N^3$-tetramethylguanidine.

Theory: 58.12% C, 9.31% H, 18.49% N. Found: 58.67% C, 9.53% H, 19.23% N.

Example V

A mixture of 88.5 parts of TMG, 100 parts methoxyethyl acrylate and 200 parts toluene was heated at about 110° C. for 6½ hours. The toluene then was stripped off at about 10 mm. and the residue fractionated at 55° C. at 2.7 mm. Hg to yield the $N^2$-(methoxyethyl acrylate) adduct of $N^1,N^1,N^3,N^3$-tetramethylguanidine, identified infrared spectra and analyzing as follows:

|  | Mol. Wt. | Percent N |
|---|---|---|
| Theory | 245 | 17.13 |
| Found | 228 | 17.78 |

Analogous compounds are prepared by replacing the TMG in Example V with equimolar amounts of other guanidyl compounds, yielding for example, the corresponding $N^2$-(2-hydroxypropyl acrylate) adducts respectively of 1-(N,N-diallylamino)-1-pyrrolidinomethyleneimine; 1-(N,N-diallylamino)-1-piperidinomethyleneimine; 1 - (N,N-diallylamino) - 1 - morpholinomethyleneimine; 2-imino-N,N'-dimethylimidazolidine or 2-imino-N,N'-dimethylhexahydropyrimidine.

Example VI

A mixture of propyleneglycol monoacrylate (22.6 parts) with 1,1-di-pyrrolidinomethyleneimine (29.0 parts) and 100 parts of toluene was heated at 110° C. for 4 hours in equipment similar to Example I. After stripping off the solvent, the residue was fractionated at 80°–82° C. at 0.08 mm. Hg to give the N-(2-hydroxypropyl acrylate) adduct of 1,1,di-pyrrolidinomethyleneimine, identified by infrared spectra and analyzing as follows:

Theory: 60.58% C, 9.15% H. Found: 61.41% C, 9.21% H.

Example VII

Using the equipment of Example I, 230 parts of TMG were added slowly with stirring to 30 parts of divinyl sulfone precooled to 10° C. After stirring for one hour, the reaction vessel was evacuated and the contents slowly warmed and fractionated at 75° C. at 0.3 mm. Hg to give the $N^2$-(divinyl sulfone)-bis adduct of $N^1,N^1,N^3,N^3$-tetramethylguanidine, alternatively termed $N^2,N^2$-(sulfonyldiethylene) - bis - ($N^1,N^1,N^3,N^3$-tetramethylguanidine), identified by infrared spectra and having an elemental analysis as follows:

Theory: 48.2% C, 9.2% H, 9.2% S. Found: 48.1% C, 8.9% H, 10.8% S.

Example VIII

Using the equiment of Example I, a mixture of 1,1-di-(4-morpholino)methyleneimine (27.6 parts), 2-phenoxyethyl acrylate (26.6 parts) and toluene (100 parts) was heated at reflux for 5 hours and then left at room temperature for 2 days. The toluene was stripped off under vacuum and the residue fractionated at 99°–107° C. at 0.01 mm. Hg to yield a liquid product analyzing for elements as follows and identified by infrared spectra as the N-(phenoxyethyl acrylate) adduct of 1,1-di(4-morpholino)methyleneimine.

Theory: 60.58% C, 9.15% H. Found: 61.41% C, 9.21% H.

Example IX

Similar to the procedure of Example V, 115 parts of TMG and 176 parts of 2-norbornen-5-ylmethyl acrylate ("Cyclol" acrylate produced by Interchemical Corp.) were reacted in 300 parts of toluene at 120° C. for 15 hours. The toluene was then stripped off and the residue fractionated at 75° C. at 1.1 mm. Hg to give a clear oil, identified by infrared spectra and the following elemental analysis as the $N^2$-(2-norbornen-5-ylmethyl acrylate) adduct of $N^1,N^1,N^3,N^3$-tetramethylguanidine.

Theory: 65.95% C, 8.65% H. Found: 65.21% C, 9.27% C.

Example X

A stirred reaction vessel equipped with Dry Ice condenser, bubble tube and nitrogen purge was charged with 17.8 parts (0.154 mol) of TMG and 140 parts of diethyl ether. The vessel was closed, purged with nitrogen and then 25 parts (0.154 mol) of hexafluoro-2-butyne gas was bubbled in slowly over a period of about 2 hours with the temperature rising from about 22° to about 30° C. Thereafter, the mixture was held at 30° C. for about 2 hours and then filtered. The filtrate was stripped of ether and then fractionated at 44° C. at 0.03 mm. Hg to yield a product identified by element analysis and infrered spectra as 1-(tetramethylguanid-2-yl)-1,2-di-trifluoromethylethylene.

Theory: 38.99% C, 4.73% H, 15.16% N, 41.12 F. Found: 38.73% C, 4.76% H, 15.62% N, 41.26% F.

In a similar experiment, a TMG adduct with 1,1,1,4,4,4-hexafluorobutene-2 is prepared by replacing the butyne of Example X with equimolar amounts of 1,1,1,4,4,4-hexafluorobutene-2.

Example XI

Using the equipment of Example I, 28 parts of tetraethyleneglycol diacrylate were dissolved in 25 parts of benzene and charged to the vessel. Then 32 parts of 1,1-diazepanomethyleneimine dissolved in 25 parts of benzene were slowly added and the mixture refluxed for 6 hours at 85° C. The benzene and unreacted materials were stripped off up to 120° C. at 0.3 mm. Hg and the residue, an amber colored oil, identified by infrared spectra as predominantly the $N^2$-(tetramethyleneglycol diacrylate) adduct of 1,1-diazepanomethyleneimine.

The 1,1-diazepanomethyleneimine above was prepared by known procedures in the art from cyanogen bromide and azepane.

In a manner similar to that of Example XI, the propylene glycol diacrylate and isopropylene glycol diacrylates are adducted respectively with 1,1-dipyrrolidinomethyleneimine and TMG respectively.

Example XII

In a procedure similar to Example I, 80 parts of TMG were added dropwise to 128.5 parts of tetrafluoropropyl acrylate (acrylate ester of tetrafluoroethylene/methanol adduct). The temperature rose to about 70° C. during the addition and the mixture was then heated at 90° C. for about one hour. The mixture was then fractionated at about 52° C. at 0.3 mm. Hg to give the $N^2$-(tetrafluoropropyl acrylate) adduct of $N^1,N^1,N^3,N^3$-tetramethylguanidine, identified by infrared spectra and having the following nitrogen analysis.

Theory: 13.95% N. Found: 14.03% N.

Analogous compounds are prepared by substituting the tetrafluoropropyl acrylate above with other fluoracrylates such as dodecafluoroheptyl acrylate.

Example XIII

A mixture of 57.5 parts of TMG and dimethyl fumarate (86.1 parts) was heated under nitrogen in the equipment of Example I for 3 hours at about 130°–140° C. The mixture was then fractionated at 110°–115° C. at 0.28 mm. Hg to yield a product identified by infrared spectra as the $N^2$-(dimethyl fumarate) adduct of $N^1,N^1,N^3,N^3$-tetramethylguanidine and having the following analysis.

Theory: 54.33% C, 8.77% H. Found: 54.27% C, 8.76% H.

In an analogous fashion, equimolar amounts of other fumarate esters are substituted for the dimethyl fumarate in Example XIII to yield corresponding adducts such as:

$N^2$-(diethyl fumarate) adduct of $N^1,N^1,N^3,N^3$-tetramethylguanidine, $N^2$-(dipentyl fumarate) adduct of $N^1,N^1,N^3,N^3$-tetramethylguanidine.

Likewise, various itaconic acid esters are used to replace the dimethyl fumarate on an equimolar basis in Example XIII to yield such corresponding compounds as:

$N^2$-(diethyl itaconate) adduct of $N^1,N^1,N^3,N^3$-tetramethylguanidine, $N^2$-(dibutyl itaconate) adduct of $N^1,N^1,N^3,N^3$-tetramethylguanidine.

Example XIV $N^1,N^1,N^3,N^3$-tetraethoxyethylguanidine is prepared from diethoxyethylamine and cyanogen bromide by procedures well known in the art, purified and then reacted with an equimolar amount of acrylonitrile in the manner of Example I to yield $N^2$-β-cyanoethyl-$N^1,N^1,N^3,N^3$-tetraethoxyethylguanidine.

Example XV

A red lead containing primer was prepared by dispersing the following ingredients in a sand mill:

| | Parts by weight |
|---|---|
| Red lead | 321 |
| Iron oxide | 755 |
| Xylene | 81 |
| V54–OP | 285 |
| V54–I | 285 |
| CBP | 45 |
| | 1762 |

The V54–OP stands for the vinyl dioxolane butanol diester of o-phthalic acid and V54–I for the corresponding diester of itaconic acid. The CBP stands for a cobalt butyl phthalate solution in xylene containing 20 mg. Co/ml. of solution.

To 100 parts portions of the above-prepared primer were added 0.2 part of an accelerator from each of the foregoing examples. Each paint was then doctor-bladed on a steel panel to give a 5 mil thick film and the drying time tack-free noted as follows, versus a control primer containing no accelerator. An efficiency factor, i.e., $$\frac{\text{dry time of control}}{\text{dry time of sample}}$$

was calculated for each:

| Example | Dry Time | Control Dry Time* | Factor |
|---|---|---|---|
| I | 2 hrs., 55 min | 7 hrs., 15 min | 2.5 |
| II | 3 hrs., 15 min | 7 hrs | 2.2 |
| III | 3 hrs., 30 min | 7 hrs., 15 min | 2.1 |
| IV | 3 hrs., 30 min | 7 hrs., 5 min | 2.0 |
| V | 4 hrs | 7 hrs., 30 min | 1.9 |
| VI | 4 hrs | 7 hrs., 15 min | 1.8 |
| VII | 3 hrs., 5 min | 5 hrs., 30 min | 1.8 |
| VIII | 4 hrs | 7 hrs | 1.8 |
| IX | 4 hrs | 7 hrs., 5 min | 1.8 |
| X | 4 hrs., 50 min | 7 hrs., 5 min | 1.5 |
| XI | 4 hrs., 10 min | 6 hrs | 1.4 |
| XII | 5 hrs., 10 min | 7 hrs., 5 min | 1.4 |
| XIII | 3 hrs., 30 min | 6 hrs | 1.7 |

*The variations in dry time of the control were due to differences in temperature and humidity when run on different days.

*Example XVI*

A white soya alkyd enamel (100 parts) was mixed with 2 parts of the CBP solution of Example XV and 0.3 part of the following accelerators, doctor knifed on glass panels to 2 mil thick films, and the air drying time noted against a control with no accelerator.

| Example | Dry Time | Control Dry Time |
|---|---|---|
| I | 4 hrs | 7 hrs., 30 min. |
| II | 3 hrs., 40 min | 7 hrs., 30 min. |

*Example XVII*

The compounds of this invention are useful as aphicides and miticides, for example:

A 1% solution in inert solvent of each of the compounds of Examples I and II was prepared. The solution of $N^2$ - carbethoxyethyl-$N^1,N^1,N^3,N^3$-tetramethylguanidine (Example II) was found to give 95% control of bean aphids when sprayed on nasturtium leaves infested with this aphid. The solution of $N^2$-($\beta$-cyanoethyl)-$N^1,N^1,N^3,N^3$-tetramethylguanidine (Example I) gives 100% control of the two-spotted mite when sprayed on bean leaves infested with this mite.

I claim:

1. A compound represented by the following structural formula

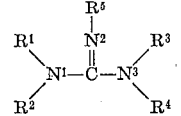

in which each of:

$R^1$, $R^2$, $R^3$ and $R^4$ are radicals selected from the class consisting of $C_1$–$C_5$ alkyl, $C_3$–$C_5$ alkenyl and $C_1$–$C_4$ alkoxy-$C_1$–$C_4$ alkyl; and $R^5$ is a member selected from the class consisting of cyanoethyl and cyanovinyl.

2. A pentasubstituted guanidine compound of claim 1 wherein $R^1$, $R^2$, $R^3$ and $R^4$ are $C_1$–$C_5$ alkyl radicals.

3. A pentasubstituted guanidine compound of claim 1 wherein $R^1$, $R^2$, $R^3$ and $R^4$ are $C_3$–$C_5$ alkenyl radicals.

4. A pentasubstituted guanidine compound of claim 1 wherein $R^1$, $R^2$, $R^3$ and $R^4$ are $C_1$–$C_4$ alkoxy-$C_1$–$C_4$ alkyl radicals.

5. A compound of claim 1 wherein $R^1$, $R^2$, $R^3$ and $R^4$ are methyl groups.

6. $N^2$ - ($\beta$ - cyanoethyl) - $N^1,N^1,N^3,N^3$ - tetramethylguanidine.

References Cited by the Examiner

UNITED STATES PATENTS 1,766,755  6/1930  Lecher et al. _____ 260—564

CHARLES B. PARKER, *Primary Examiner.*

ALTON D. ROLLINS, *Assistant Examiner.*